Nov. 10, 1953      J. H. SENG      2,658,438

TRACTOR MOUNTING FOR AGRICULTURAL IMPLEMENTS

Filed July 11, 1950      3 Sheets-Sheet 1

INVENTOR.
JAMES H. SENG
BY
McMorrow, Berman + Davidson
ATTORNEYS

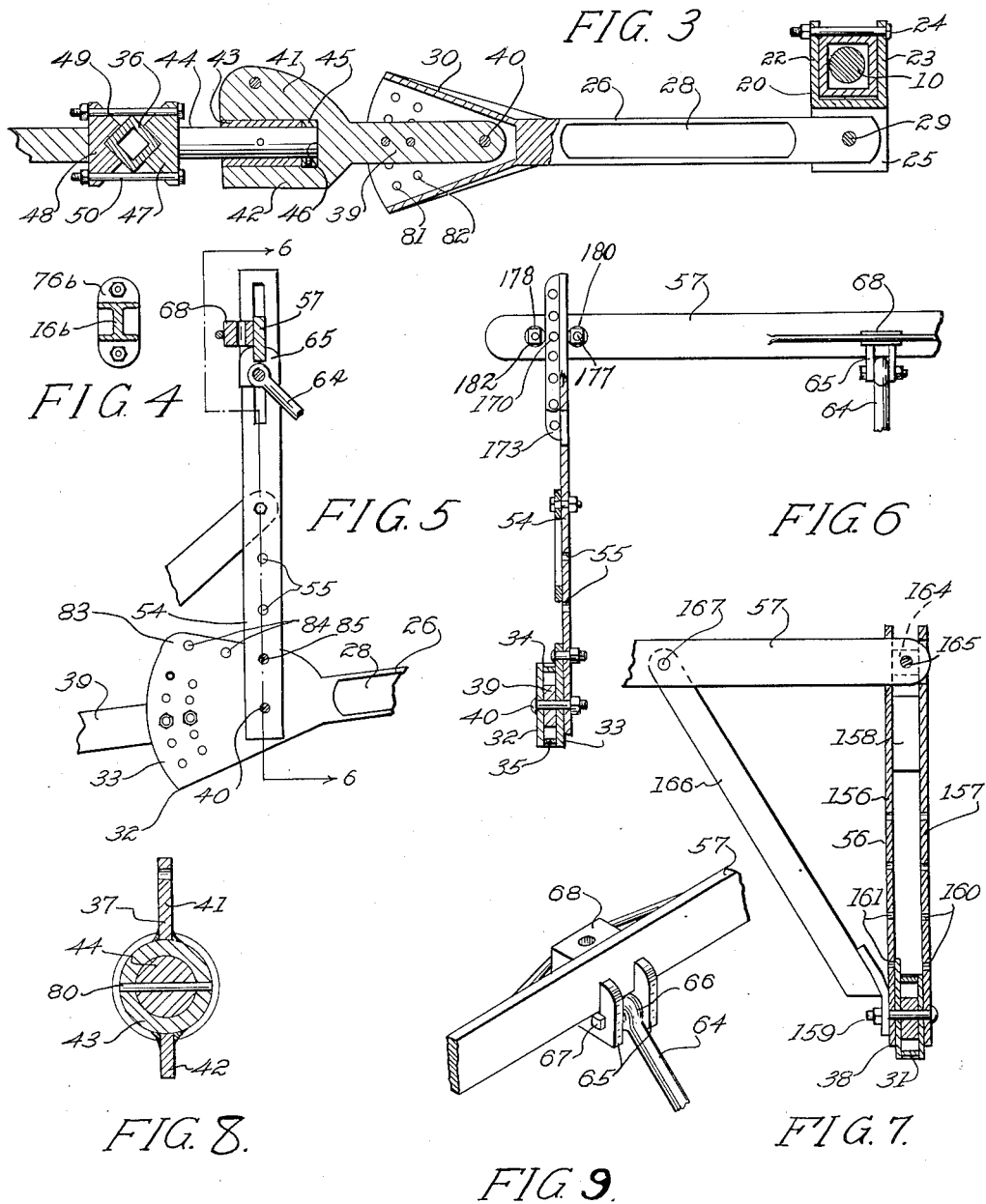

Nov. 10, 1953 J. H. SENG 2,658,438
TRACTOR MOUNTING FOR AGRICULTURAL IMPLEMENTS
Filed July 11, 1950 3 Sheets-Sheet 3
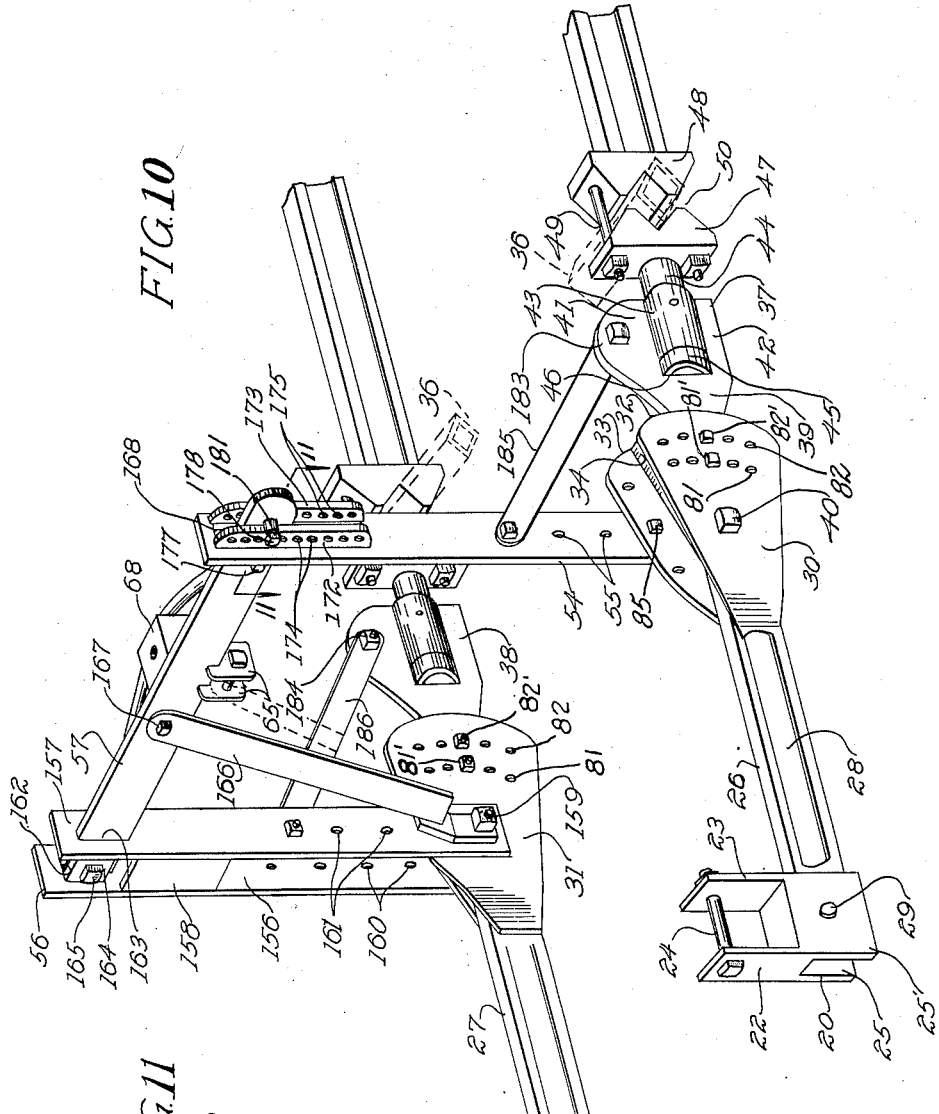
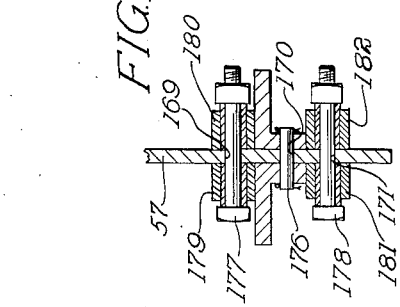
INVENTOR.
JAMES H. SENG
BY
McMorrow, Berman + Davidson
ATTORNEYS Patented Nov. 10, 1953

2,658,438

UNITED STATES PATENT OFFICE 2,658,438

TRACTOR MOUNTING FOR AGRICULTURAL IMPLEMENTS

James H. Seng, Salina, Kans.

Application July 11, 1950, Serial No. 173,028

2 Claims. (Cl. 97—46.59)

1

This invention relates to tractor mountings for agricultural implements and more particularly to a mounting for various types of implements and by means of which an implement lifting force or an implement depressing force can be exerted on an implement connected to a tractor.

It is among the objects of the invention to provide an improved mechanism for connecting an agricultural implement to a tractor for towing of the implement by the tractor and for providing a power operated lift carried by the tractor for raising and lowering the implement and maintaining ground engaging pressure on the implement when lowered, which mechanism may provide a limited freedom of fore and aft rocking or tilting movement of the implement relative to the tractor and freedom of side to side rocking or tilting movement of the implement relative to the tractor to compensate for inequalities in the ground over which the tractor and associated implement pass, which is adjustable to preclude fore and aft rocking movements of the implement relative to the towing tractor and maintain the implement, when lowered, at a desired inclination in a fore and aft direction relative to the ground, which is adjustable to eliminate side to side rocking movement of the implement relative to the towing tractor and to provide a desired side to side inclination of the implement relative to the ground when the implement is raised, which can be adjusted to apply elevating and depressing forces to the front end of an associated implement prior to the application of such forces to the entire implement or to immediately apply such forces to the entire implement, which is easily adjustable to vary both the fore and aft and side to side inclination of the implement relative to the ground and is variable within a wide range of adjustment, which can be operated by the existing hydraulic system of the tractor, which can be quickly and easily installed on an existing tractor with no material modification of the tractor construction, which is strong and durable in construction and substantially rigid when adjusted for a desired inclination of the implement, and which is economical to manufacture and positive and effective in operation.

Other objects and advantages will become apparent from a consideration of the following description and the appended claims in conjunction with the accompanying drawings wherein:

Figure 3 is a cross sectional view on an enlarged scale on the line 3—3 of Figure 2;

Figure 4 is a cross sectional view on the line 4—4 of Figure 2;

Figure 5 is a cross sectional view on the line 5—5 of Figure 2;

Figure 6 is a cross sectional view on the line 6—6 of Figure 5;

Figure 7 is a cross-sectional view substantially in the same plane as Figure 6, but showing the other side of the mechanism;

Figure 8 is a cross sectional view on the line 8—8 of Figure 2;

Figure 9 is a perspective view of a fragmentary portion of the mechanism showing a connection between an implement lifting hydraulic device and a lift bar, both constituting components of the improved mounting mechanism;

Figure 10 is a perspective view of the mounting mechanism; and

Figure 11 is a cross sectional view on the line 11—11 of Figure 10.

Figures 1, 2:
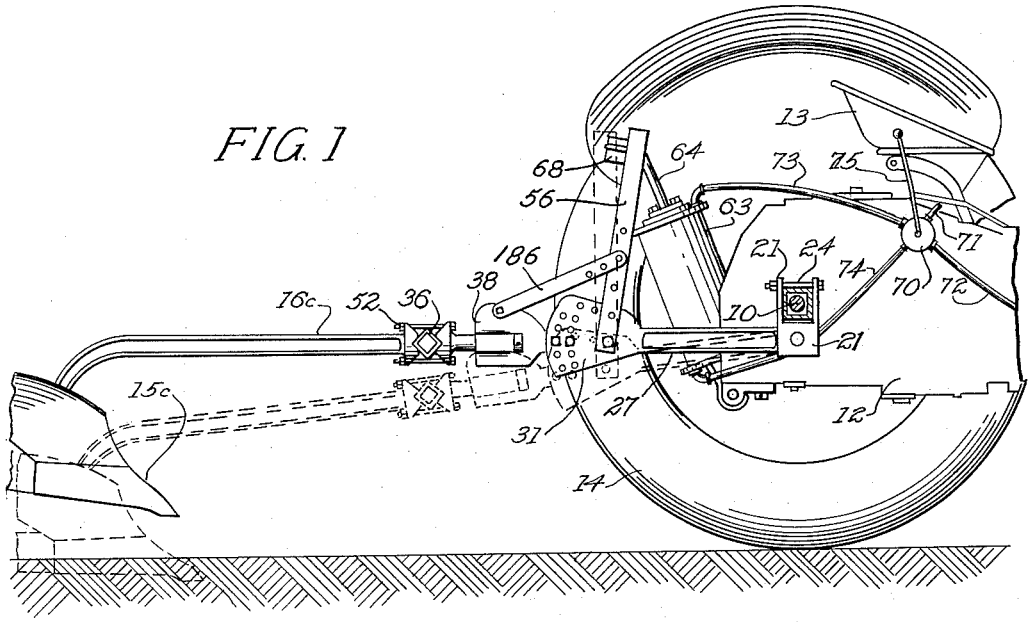
Figure 1 is a side elevational view of a fragmentary rear portion of a tractor and of a tractor towed implement with a mounting mechanism illustrative of the invention interposed between the tractor and the implement, one rear wheel of the tractor being omitted to better illustrate the construction of the mounting mechanism.
Figure 2 is a top plan view of the tractor fragment, implement and mounting means illustrated in Figure 1.

With continued reference to the drawings, the tractor fragmentarily illustrated in Figures 1 and 2 may be any one of several types of existing farm tractors and has a rear axle 10 including a differential mechanism enclosed in a suitable housing 11, a transmission mechanism enclosed in a housing 12 connected to the differential mechanism housing, a driver's seat 13 mounted on the transmission housing and disposed above the transmission and differential housings, and rear wheels, one of which is indicated at 14 in Figure 1, mounted one on each end of the rear axle 10.

The implement illustrated comprises a plow gang having three plow shares 15a, 15b and 15c and three plow beams 16a, 16b and 16c each connected at one end to a corresponding plow share and projecting therefrom past the point end of the plow share. Spacing bars 17a and 17b are connected between the plow beams at the share connected ends of the beams to hold the beams in spaced apart relationship relative to each other and diagonal braces 18a and 18b are secured to and extend between the plow beams to maintain the plow beams in spaced apart and substantially parallel relationship to each other.

While a plow has been illustrated for the purposes of disclosing the invention, it is to be understood that the device of the invention is applicable to a wide range of different kinds of agricultural implements.

The mechanism for mounting the implement on the tractor comprises two brackets 20 and 21 secured to the tractor rear axle 10 at respectively opposite sides of the differential housing 11. In the arrangement illustrated the rear axle of the tractor is of square or rectangular cross sectional shape and the bracket 20 has two spaced apart arms 22 and 23, disposed one at the rearward side and one at the forward side of the axle and connected together at the top of the axle by a through bolt 24 extending through registering apertures in the corresponding ends of the arms and bearing on the upper side of the tractor rear axle. Two spaced apart and substantially parallel lugs 25 and 25' are secured to the legs 22 to depend from the tractor axle and extend transversely of the latter in spaced apart and substantially parallel relationship to each other. The bracket 21 is substantially identical with the bracket 20.

Two links 26 and 27 are pivotally connected, each at one end, to the tractor rear axle by an associated bracket and extend rearwardly from the latter in spaced apart and substantially parallel relationship to each other.

The link 26 comprises a bar portion 28 having flat, substantially parallel sides and this bar portion is received at one end between the lugs 25 and 25' of the corresponding bracket 20. The bracket lugs and the bar portion are provided with registering apertures and a pivot pin or bolt 29 extends through these apertures to pivotally connect the link to the corresponding bracket, the axis of this pivot bolt being substantially parallel to the longitudinal center line of the tractor axle. The lugs 25 and 25' are spaced apart a distance substantially equal to the thickness of the bar portion so that, while the link may swing upwardly and downwardly relative to the bracket, it has substantially no freedom of lateral movement and the rear end of the link cannot move to any material extent laterally of the rear end of the tractor or longitudinally of the tractor axle.

A socket formation 30 is provided at the end of the link opposite the end of this link connected to the tractor axle which socket formation is sector shaped and comprises, in effect, a hollow housing of elongated, rectangular cross sectional shape the edges of which diverge in a direction away from the corresponding end of the bar portion of the link. The socket has two spaced apart and substantially parallel side walls 32 and 33, as particularly illustrated in Figure 6, connected along the opposite edges of the socket by the mutually diverging edge walls 34 and 35, the socket dimension between the edge walls 34 and 35 being disposed substantially perpendicular to the axis of the pivot bolt 29 and being materially greater than the distance between the side walls 32 and 33.

The link 27 is substantially identical to the link 26 and is connected to bracket 21 by a pivot bolt 29'. This link has at its end remote from bracket 21 a socket 31 similar to socket 30.

A tool bar 36 is disposed in spaced relationship to the sockets 30 and 31 and is secured to the sockets 30 and 31 by swivel connectors 37 and 38 respectively.

The two swivel connectors are substantially identical in construction and the connector 37 is particularly illustrated in Figure 3. This connector includes an arm 39 received in the socket 30 and pivotally connected to the socket by a pivot bolt 40 which extends through an aperture in the arm 39 near one end of the latter and through registering apertures in the side walls 32 and 33 of the socket near the adjacent end of the bar portion 28 of the link 26.

Side walls 32 and 33 of the socket are spaced apart a distance substantially equal to the thickness of the arm 39 so that, while the arm 39 can move in the socket about the pivot bolt 40, it has substantially no freedom of lateral movement relative to the socket.

At its end remote from the pivot bolt 40 the arm is bifurcated to provide two spaced apart legs 41 and 42, and a cylindrical sleeve 43 is secured between these legs. A shaft 44 is journaled in and extends through the sleeve 43 and has a collar 45 secured on its end adjacent the socket 30, this collar being received in an opening 46 provided in the arm 39 at the adjacent end of the sleeve 43.

A clamp formation 47 is provided on the other end of the shaft 44 and has a V-shaped notch receiving one edge of the tool bar 36. A clamp cap 48 is disposed at the opposite side of the tool bar and secured to the formation 47 by two bolts 49 and 50 disposed at respectively opposite sides of the tool bar. By this means the tool bar is firmly secured to the shafts of the swivel connectors 37 and 38 by the clamps 51 and 52 as designated in Figures 2 and 9.

A strut 54 is connected near one end to the socket 30 by the pivot bolt 40 extending through an aperture in the strut. This strut is a single flat bar and is provided with a series of spaced apart apertures 55 which may selectively receive the pivot bolt 40 for adjustably connecting the strut to the socket. A strut 56 is adjustably connected to the socket 31 and the two struts extend upwardly from the corresponding sockets in spaced apart and substantially parallel relationship to each other.

The strut 56 comprises two flat bars 156 and 157 secured in spaced apart and substantially parallel relationship to each other by a web section 158 disposed between the bars intermediate the length thereof. The bars 156 and 157 are disposed at respectively opposite sides of the socket 31 and are pivotally connected to the socket by the pivot bolt 159 which passes through registering apertures in the bars 156 and 157, the side walls of the socket 31 and the arm of the swivel connector 38.

The bars 156 and 157 are provided with a series of spaced apart apertures 160 and 161 respectively for selectively receiving the bolt 159 to adjustably connect the strut 56 to the socket 31. At their ends remote from the socket 31 the bars 156 and 157 are provided with mutually registering apertures 162 and 163 respectively.

A transverse lift bar 57 is received at one end in the apertures 162 and 163 and secured therein by a block 164 disposed between the bars 156 and 157 and secured to lift bar 57 by a bolt 165.

A diagonal brace 166 is secured at one end to the bolt 159 and at its other end to lift bar 57 by a bolt 167 at a location spaced from the strut 56 and maintains the lift bar 57 substantially perpendicular to the strut 56.

At its other end the lift bar 57 is received in an elongated slot 168 in the strut 54 near the end of this strut remote from the socket 30 and is provided near this other end with three apertures 169, 170 and 171 spaced apart longitudinally of this lift bar.

Ribs 172 and 173 are disposed along respectively opposite sides of the slot 168 and are provided with a series of spaced apart apertures 174 and 175 respectively. A pin 176 is inserted through selected registering apertures in the ribs 172 and 173 and through the intermediate aperture 170 in the bar 57. Bolts 177 and 178 are inserted through the apertures 169 and 171 respectively and rollers 179 and 180 are journalled on bolt 177 at respectively opposite sides of bar 57 while similar rollers 181 and 182 are journaled on bolt 178. Spacing sleeves are disposed between the bolts and the corresponding rollers and the rollers 179 and 180 bear against strut 54 at respectively opposite sides of slot 168 while rollers 181 and 182 bear on the outer edges of ribs 172 and 173.

A hydraulic cylinder 63 is pivotally mounted at one end on the rear end of the tractor or on the tractor drawbar substantially at the mid-length location of the tractor rear axle 10 and a piston rod 64 projects from the other end of the cylinder. This piston rod is connected within the cylinder to a reciprocating piston, not illustrated, and the piston is double acting, being effective to force the piston rod either inwardly or outwardly of the corresponding end of the cylinder. The lift bar 57 is provided on its tractor adjacent side with two spaced apart apertured lugs 65 which depend from the lower edge of the lift bar and the piston rod 64 is provided on its outer end with an eye 66, particularly illustrated in Figure 8, received between the lugs 65 and pivotally connected to the lift bar 57 by a pivot bolt 67 extending through registering apertures in the two lugs 65 and the eye 66 of the piston rod.

An apertured tongue 68 projects from one side of the lift bar 57 substantially at the mid-length location of the lift bar and may be used for connecting the rear end of an implement to the lift bar to relieve some of the strain on the swivel connectors 37 and 38 or for other purposes, as may be found desirable.

A suitable manually operated valve 70 is mounted on the tractor at a location convenient to the seat 13 and is connected to the outlet side of a tractor operated pump by conduit 71 and to the pump inlet or a sump by the conduit 72. A conduit 73 connects the valve to the upper end of the cylinder 63 from which the piston rod 64 projects and a conduit 74 connects the valve to the lower end of the cylinder.

A hand lever 75 is connected at one end to the valve 70 and is effective to move the valve from one to the other of its operating positions. In one of the operative positions of the valve hydraulic fluid under pressure is applied to the upper end of the cylinder to force the piston rod 64 inwardly of the cylinder while the lower end of the cylinder is connected to a drain, and in another position of the valve hydraulic fluid under pressure is applied to the lower end of the cylinder to force the piston rod outwardly of the upper end of the cylinder while the upper end of the cylinder is connected to a drain.

With this arrangement, when the piston rod 64 is forced outwardly of the cylinder the lift bar 57 will be forced upwardly relative to the tractor and will lift the rearward, socket carrying ends of the links 26 and 27. The arms of the swivel connectors 37 and 38 will pivot about the corresponding pivot bolts connecting them to the sockets rotating the lift bar and raising the front end of an implement connected to the lift bar and, when these arms contact the bottom edge walls of the sockets the swivel connectors will be bodily raised, lifting the entire implement connected to the tool bar since the links and the swivel connectors now constitute rigid levers extending from the brackets 20 and 21 to the tool bar 36.

Where the implement is relatively short, as the plow gang illustrated in Figures 1 and 2, and is rigidly connected at its front end to the tool bar as by the rigid clamps 76a, 76b and 76c, the entire implement will be raised when the lift bar 57 has been brought to a sufficient height, but where a long implement is pivotally connected to the tool bar, it is possible with the mounting of the present invention, to lift only the front end of the implement, the rear end of the implement being supported on one or more trailing wheels.

When the valve 70 is positioned to force the piston rod 64 inwardly of the cylinder 63, a downward force is exerted through the struts 54 and 56 on the sockets 30 and 31 and a downward force is exerted on the tool bar 36 and on the implement attached to the tool bar.

The swivel connectors 37 and 38, together with the pivotal connections between the lift bar and the struts, permit the tool bar 36 to tilt longitudinally relative to the tractor rear axle 10 when the tractor and implement traverse uneven ground so that the tractor and the implement can both follow the contour of the ground and tilting of the tractor will not change the depth of operation at the opposite sides of the implement.

Under certain operating conditions it is desirable to eliminate the freedom of tilting movement of the tool bar relative to the tractor rear axle and also to eliminate the pivotal movements of the swivel connectors relative to the traction links and pivoting of the lift struts relative to the traction link sockets.

Each traction link sleeve is provided with a transversely or diametrically extending aperture, as illustrated in connection with the sleeve 43 of the connector 37 in Figure 7, and the corresponding shaft, as the shaft 44, is provided with a diametrically extending aperture which registers with the aperture in the sleeve when the shaft is in a predetermined position relative to the sleeve. A locking pin 80 can be inserted through the registering apertures in the sleeve and shaft of each swivel connector when the shaft is in its predetermined position relative to the sleeve to lock the shaft against rotational movement relative to the corresponding sleeve. This will render the swivel connectors rigid and eliminate tilting movement of the tool bar relative to the rear axle of the tractor.

The side plates of each of the sockets 30 and 31 are provided with a series of spaced apart apertures, as indicated at 81 and 82 in Figure 3, and the arms of the corresponding swivel connectors are provided with apertures selectively registrable with apertures in the socket side plates. Locking pins 81' and 82' are insertable through registering apertures in the socket side plates and in the corresponding swivel connector arms to lock the arms in predetermined position relative to the sockets so that the arms cannot swing up and down relative to the sockets.

With this construction, the tool bar 36 is held at a definite elevation relative to the tractor as determined by the position of the piston rod 69 and any fore and aft tilting or rocking movements on the implement are substantially eliminated. This locking of the sockets to the swivel connectors also facilitates the application of downward pressure by the hydraulic mechanism to the rear end portion of the implement to force the implement into operative engagement with the ground and maintain the implement at any desired inclination relative to the ground.

A flange, as indicated at 83 in Figure 5, is provided along the upper edge of each of the sockets 30 and 31 and preferably constitutes an upward continuation of the inner side wall of the socket. This flange is provided with spaced apart apertures 84 which are selectively registrable with a selected one of the apertures 55 in the corresponding strut 54 or 56. A locking pin 85 may be inserted through registering apertures in the flange 83 of each of the sockets and in the corresponding strut 54 or 56, the locking pins engaging the two struts holding the struts rigidly at predetermined angles relative to the corresponding sockets.

This provides an adjustment for positioning the struts at desired angles relative to the links 26 and 27.

The arms of the swivel connectors 37 and 38 are provided on their upper edges with apertured lug formations 183 and 184 respectively. A diagonal brace 185 is connected at one end to the lug formation 183 and at its other end to the strut 54 intermediate the length of the latter while a similar diagonal brace 186 is connected at one end to lug formation 184 and at its other end to strut 56 intermediate the length of this strut. The braces 185 and 186 maintain the struts 54 and 56 in desired angular position relative to the swivel connectors 37 and 38.

The device may be installed on a tractor merely by the insertion of the three pivot pins or bolts connecting the links 26 and 27 to the brackets 20 and 21 and connecting the piston rod 64 to the lift bar 57 and may be detached by removing these pivot pins or bolts. The device may be left in place on the tractor and will not interfere with the operation of the tractor with the original drawbar equipment of the tractor. The construction of the brackets 20 and 21 and of the sockets 30 and 31 substantially eliminates side sway of the implement relative to the tractor while the mechanism, at the same time, provides a wide range of vertical movement of the implement relative to the tractor and a wide range of movements of adjustment of the implement transversely of the tractor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an agricultural tractor having a rear axle, mechanism for mounting an agricultural implement on the tractor comprising elongated links each having at one end a sector shaped socket formation, brackets pivotally connected one to each of said links at the other ends thereof and connecting said links to said tractor axle, an implement carrying tool bar disposed substantially parallel to said tractor rear axle and spaced from said socket formations, swivel connectors connecting said socket to said tool bar and including parts relatively movable about axes substantially parallel to the longitudinal center lines of the corresponding links, a hydraulic cylinder mounted at one end on said tractor in upwardly extending position and having a piston rod projecting from its upper end, and means connecting said links to said piston rod for up and down movement of said links and said tool bar in response to movement of said piston rod inwardly or outwardly of said cylinder.

2. In combination with an agricultural tractor having a rear axle, mechanism for mounting an agricultural implement on the tractor comprising elongated links each having at one end a sector shaped socket, brackets pivotally connected one to the other end of each link and to said rear axle connecting said links to said axle, an implement carrying tool bar spaced from said link sockets, swivel connectors connecting said sockets to said tool bar and each comprising an arm pivotally secured in the corresponding socket, a bearing sleeve secured to said arm and extending away from the socket, a shaft journaled in said sleeve and having on one end a head bearing on the socket adjacent end of the associated sleeve and a tool bar engaging clamp pivotally connected to the other end of said shaft, a hydraulic cylinder mounted at one end on the tractor in upwardly extending position and having a piston rod projecting from its other end, and means connecting said links to said piston rod for movement of said links and said tool bar in response to movement of said piston rod inwardly or outwardly of said cylinder.

JAMES H. SENG.

References Cited in the file of this patent
UNITED STATES PATENTS

| Number | Name | Date |
|---|---|---|
| 1,419,014 | Burtnett | June 6, 1922 |
| 1,505,201 | Johnson | Aug. 19, 1924 |
| 1,663,249 | Graham et al. | Mar. 20, 1928 |
| 1,807,731 | Ehricke | June 2, 1931 |
| 1,977,422 | Benjamin | Oct. 16, 1934 |
| 2,198,196 | Goldup | Apr. 23, 1940 |
| 2,477,994 | Love | Aug. 2, 1949 |
| 2,593,176 | Patterson | Apr. 15, 1952 |